July 15, 1969 L. G. METZGER 3,455,492

CARTRIDGE FOR TAPE LOOP RANDOM ACCESS MEMORY

Filed June 9, 1967

INVENTOR
LOUIS G. METZGER 3,455,492

CARTRIDGE FOR TAPE LOOP RANDOM ACCESS MEMORY

Louis G. Metzger, New York, N.Y., assignor to Potter Instrument Company, Inc., Plainview, N.Y., a corporation of New York Filed June 9, 1967, Ser. No. 645,000
Int. Cl. B65h *23/26, 23/32;* G03b *1/56*
U.S. Cl. 226—89 5 Claims

ABSTRACT OF THE DISCLOSURE

An interchangeable cartridge for magnetic tape loops in a random access information processing device includes a plurality of rods interconnected by linkages that permit the rods to be moved between a tape supporting position and a retracted nonsupporting position. The rods, in their tape supporting position, are spaced apart to span the drive block on the information processing device, and are retractable into recesses in the drive block, thereby transferring the tape to the drive block for operation with the information processing device.

BACKGROUND OF THE INVENTION

The present invention, generally, relates to random access information processing devices employing endless magnetic tape loops and, more particularly, to a new and improved tape cartridge for use with such mechanisms or equipment.

A co-pending application Ser. No. 385,727, now U.S. Patent No. 3,378,826, filed July 28, 1964 and assigned to the same assignee as the application, discloses a random access memory in which the information is stored on endless tape loops that store in interchangeable cartridges. An object of the present invention is to provide a new tape cartridge for such a random access data processing machine which is economical to manufacture and yet is reliable and efficient in operation.

SUMMARY OF THE INVENTION

Briefly, a tape cartridge contemplated by this invention supports the tape loops on four parallel rods which are relatively movable between a first position in which the tapes are relatively taut, forming loops that clear the drive blocks and a second position in which the rods are clear of the loops.

BRIEF DESCRIPTION OF THE DRAWINGS

Other objects of the invention will be pointed out in the following description and claims and illustrated in the accompanying drawings, which disclose, by way of example, the principle of the invention and the best mode, which has been contemplated, of applying that principle.

In the drawings.

DESCRIPTION OF THE PREFERRED EMBODIMENTS

Figure 1:
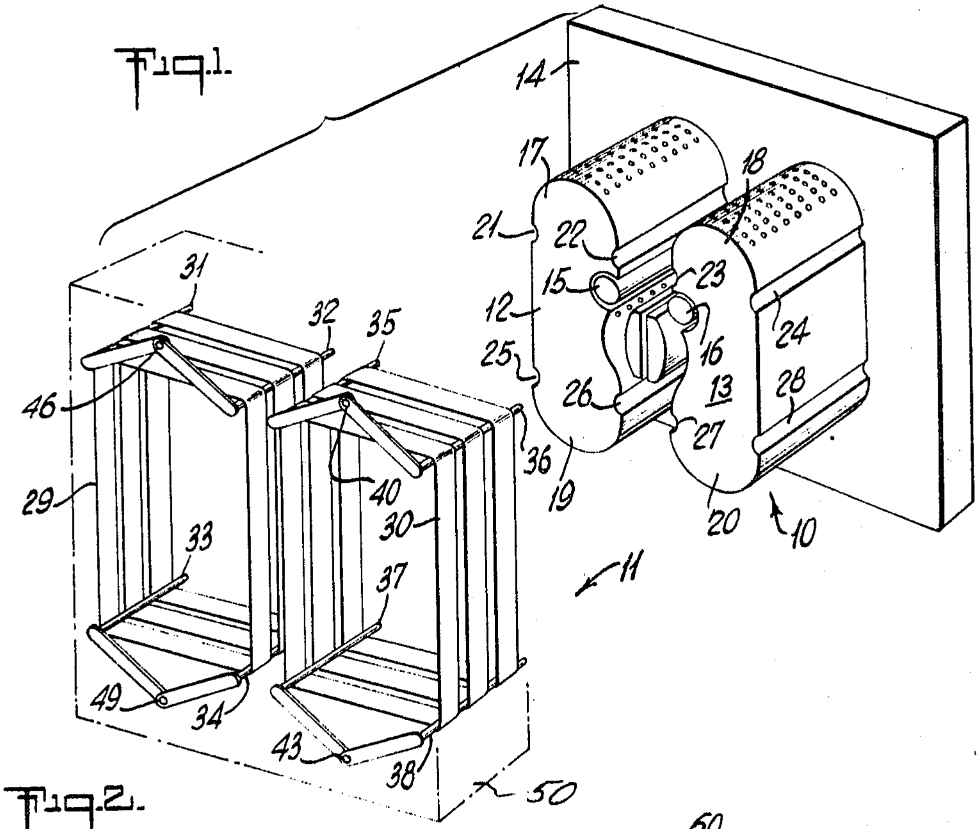
FIGURE 1 is a perspective schematic view of a tape cartridge of this invention and of a random access information processing machine which can utilize such a cartridge.

Referring now to the drawings, the numeral 10 identifies, generally, a random access information processing machine utilizing one or more closed-end loops of magnetic data processing tape. The reference numeral 11 identifies, generally, a tape cartridge of the present invention which carries two groups of tape loops 29 and 30, respectively.

Two so-called drive blocks 12 and 13 are mounted directly on the random access information processing machine 14; capstans 15 and 16 are driven by a suitable motor (not shown) within the machine 14 and are adapted to frictionally engage the loops 29 and 30 when the cartridge 11 is in position on the machine. Upper turnarounds 17 and 18 and lower turnarounds 19 and 20 are integral with the drive blocks 12 and 13, respectively. Advantageously, these turnarounds are air bearings as indicated by the ports formed therein. The drive blocks 12 and 13 are more fully described in the previously mentioned co-pending application and further detailed explanations are therefore believed to be unnecessary. One structural feature, however, should be pointed out, and that relates to two upper recesses 21 and 22 beneath the turnaround 17 and similar upper recesses 23 and 24 beneath the turnaround 18. Corresponding recesses 25 and 26 are just above the lower turnaround 19, and corresponding recesses 27 and 28 are just above the lower turnaround 20. The purpose and function of these recesses will become more apparent presently.

Two groups of magnetic tape loops 29 and 30 have respective upper and lower supports to hold the loops substantially taut and permit them to pass easily over and around the respective drive blocks 12 and 13. The upper support for the tape loops 29 is formed by parallel rods 31 and 32; two similar rods 33 and 34 form the lower support. Linkages 46 and 49 connect the rods 31–32 and 33–34, respectively. In like manner, rods 35 and 36 form the upper support for the tape loops 30, and rods 37 and 38 form the lower support. Linkages 40 and 43 connect rods 35–36 and 37–38, respectively.

Figure 2:
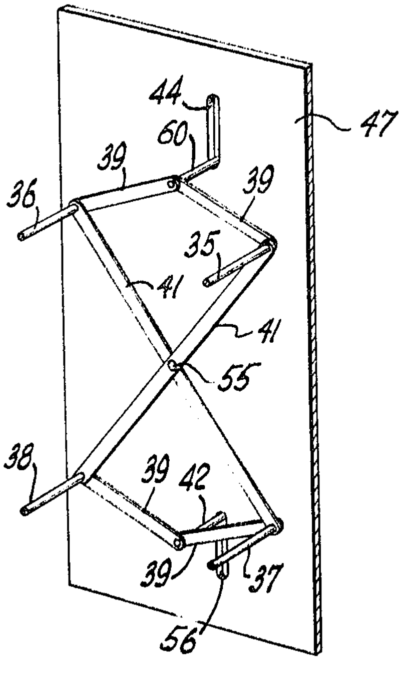
FIGURE 2 is a fragmentary perspective view showing certain details of the tape cartridge of FIGURE 1.
Figure 3:
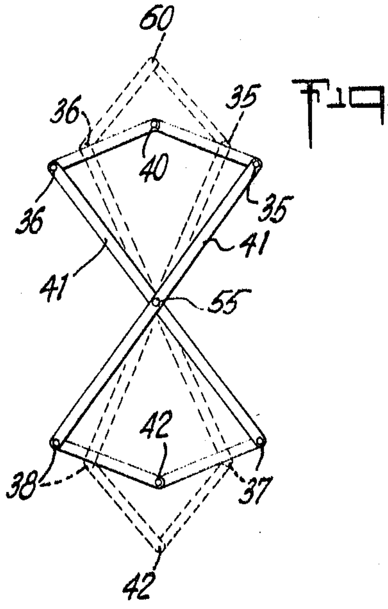
FIGURE 3 is a fragmentary view of the cartridge of FIGURE 1 showing the position of the linkage mechanism when supporting the loops in full lines and the position of the linkage mechanism when clear of the loops in dotted lines.

FIGURE 2 shows details of a typical linkage mechanism for moving the rods 35, 36, 37 and 38 between a first position shown in the full lines of FIGURE 3 in which the tapes are taut and spread so that they clear the drive blocks and a second position shown dotted in which the rods are clear of tapes. Conveniently, the parallel rods are connected by levers 39 and 41 to a pivot pin 55 attached to the rear wall 47 of the cartridge 50. A pair of pins 60 and 42, which ride in slots 44 and 56 formed in the rear wall 47 of the cartridge housing, are connected to the linkage mechanism. Handles may be conveniently provided on the ends of pins 60 and 42 so that they may be grasped and moved apart to the end that the rods 35, 36, 37 and 38 assume the position shown dotted in FIGURE 3. In this position, the rods will nest in recesses 23, 24, 27 and 28 in the drive blocks.

The actual configuration of the respective upper and lower tape loop supports may be modified. For example, it will be readily apparent that any suitable lever locking or biasing means may be used to retain the rods in their tape supporting position if necessary.

The above description is of a presently preferred embodiment of the invention, and many modifications may be made thereto without departing from the spirit and scope of the invention, which is limited only as defined in the appended claims.

What is claimed is:

1. A tape cartridge for retaining at least one endless belt of data processing tape and for transferring the endless belt of tape to a data processing device, comprising;

tape support means within said cartridge movable between a first and a second position, said support means in said first position configuring the endless belt of data processing tape into a substantially taut, open loop, said support means in said second position being substantially clear of said endless belt, and means connected with said tape support means for controlling movement of said tape support means between said first position and said second position.

2. A tape cartridge as set forth in claim 1 wherein said tape support means includes four parallel rods.

3. A tape cartridge as set forth in claim 2 wherein said controlling means includes a plurality of linkages for controlling movement of said tape support means.

4. A tape cartridge as set forth in claim 3 wherein said linkages cause an arcuate movement of said rods.

5. A tape cartridge as set forth in claim 4 wherein said rods form a generally rectangular array.

References Cited

UNITED STATES PATENTS

| | | | |
|---|---|---|---|
| 2,637,560 | 5/1953 | Smith | 226—90 |
| 3,315,861 | 4/1967 | Metzger | 226—90 |

ALLEN N. KNOWLES, Primary Examiner

U.S. Cl. X.R.

226—199